(12) United States Patent
Ramdasi et al.

(10) Patent No.: US 12,499,521 B1
(45) Date of Patent: Dec. 16, 2025

(54) AUTOMATED RETOUCHING OF STUDIO IMAGES

(71) Applicant: The RealReal, Inc., San Francisco, CA (US)

(72) Inventors: Pratik Mohan Ramdasi, Sunnyvale, CA (US); Christopher Brossman, San Francisco, CA (US); Sowmya Tatavarty, Redwood City, CA (US); Agustin Mautone, Montevideo (UY); Fabrizio Albertoni, Montevideo (UY)

(73) Assignee: The RealReal, Inc., San Francisco, CA (US)

( * ) Notice: Subject to any disclaimer, the term of this patent is extended or adjusted under 35 U.S.C. 154(b) by 504 days.

(21) Appl. No.: 18/296,251

(22) Filed: Apr. 5, 2023

(51) Int. Cl.
*G06T 5/77* (2024.01)
*G06T 5/50* (2006.01)

(52) U.S. Cl.
CPC .............. *G06T 5/77* (2024.01); *G06T 5/50* (2013.01); *G06T 2207/20084* (2013.01); *G06T 2207/20221* (2013.01)

(58) Field of Classification Search
CPC ... G06T 5/77; G06T 5/50; G06T 2207/20084; G06T 2207/20221
See application file for complete search history.

(56) References Cited

U.S. PATENT DOCUMENTS

| | | | |
|---|---|---|---|
| 7,869,648 B2 | 1/2011 | Schiller et al. | |
| 9,996,909 B2 | 6/2018 | Masuko et al. | |
| 10,217,195 B1 | 2/2019 | Agrawal et al. | |
| 10,657,584 B1 * | 5/2020 | Kim | G06N 3/0455 |
| 10,964,078 B2 | 3/2021 | Wiesel et al. | |
| 10,991,067 B2 | 4/2021 | Appleboim et al. | |
| 11,069,089 B2 | 7/2021 | Ueda et al. | |
| 2009/0075561 A1 * | 3/2009 | Doellefeld | A41D 1/22 2/69 |
| 2013/0066750 A1 | 3/2013 | Siddique et al. | |
| 2020/0320769 A1 * | 10/2020 | Chen | G06N 3/0464 |
| 2021/0090209 A1 * | 3/2021 | Appleboim | G06Q 30/0631 |

(Continued)

FOREIGN PATENT DOCUMENTS

| | | |
|---|---|---|
| CN | 110400323 B | 11/2020 |
| JP | 2005216094 A | 8/2005 |

(Continued)

OTHER PUBLICATIONS

Zhang, H et al., "Clothingout: a Category-supervised Gan Model for Clothing Segmentation and Retrieval". Published In: Neural Computing & Applications 32(9): 4519-4530. Aug. 17, 2018. DOI: https://doi.org/10.1007/s00521-018-3691-y.

(Continued)

*Primary Examiner* — Phuoc Tran
(74) *Attorney, Agent, or Firm* — Adibi IP Group, PC; Amir V. Adibi; Andrew C. Palmer

(57) ABSTRACT

Methods and apparatus for automated retouching of studio images are disclosed. In one embodiment, a method is provided that includes receiving an image that shows an item and a prop. The prop supports the item and includes a joint that forms a seam that is visible in the image. The method also includes modifying the image such that the seam is not visible in the image and the item in the image is unaltered.

13 Claims, 21 Drawing Sheets

(56) References Cited

U.S. PATENT DOCUMENTS

2021/0161235 A1 6/2021 Schultz et al.
2024/0331211 A1* 10/2024 Davis ...................... G06T 11/60

FOREIGN PATENT DOCUMENTS

JP 2020112907 A 7/2020
WO 2002057964 A2 7/2002

OTHER PUBLICATIONS

Zorah Lahner, "Deepwrinkles: Accurate and Realistic Clothing Modeling". Published In: Proceedings of the European Conference on Computer Vision (ECCV) 2018: 667-684. Aug. 10, 2018. DOI: https://doi.org/10.1007/978-3-030-01225-0_41 Abstract; p. 8, Section 4; p. 10, Section 4.2 and p. 11, Section 5.

* cited by examiner

EXAMPLE OF PRODUCT DETAIL PAGE

PRODUCT IMAGING SYSTEM

BACKGROUND REMOVAL AND TRIMMING

EXAMPLE OF MASK GENERATION
(STEPS 401-407)

REMOVE BACKGROUND USING MASK
(STEP 408)

**TRIM BACKGROUND
(STEP 409)

**IMAGE ALIGNMENT
(FUNCTION 302)

EXAMPLE OF TRANSFORMATION USING ML MODEL TO PERFORM IMAGE ALIGNMENT (FUNCTION 302)

VERTICAL CROP
(MEDIUM CROP)

TRAIN JOINTS RECOGNITION MODEL

TRAIN SEGMENTATION MODEL

TRAIN IMAGE TRANSLATION MODEL
(FEATURE REMOVAL)

DETAILED TRAINING OF IMAGE TRANSLATION MODEL

METHOD TO MODIFY FEATURE

METHOD TO TRAIN BASE REMOVAL MODEL

METHOD TO REMOVE BASE OF PROP

FEATURE REMOVER

IMAGE-TO-IMAGE TRANSLATION MODEL PROCESSING

GENERATE PRODUCT AND BACKGROUND MASKS

GENERATE MERGED PRODUCT AND BACKGROUND MASKS

EXAMPLE OVERLAY PROCESS FOR LEFT SIDE

AUTOMATED RETOUCHING OF STUDIO IMAGES

TECHNICAL FIELD

The present invention relates generally to imaging systems, and more specifically, to automated retouching of studio images.

BACKGROUND INFORMATION

Retail providers typically offer many types of items for sale and carry a significant variety of inventory. Such retailers often sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device.

After selecting an item of interest to view, the customer is presented with a Product Description Page (PDP). The PDP provides the customer with information in connection with the selected item of interest, including one or more images, price information, and a description of the item. The customer is able to purchase the selected item via the PDP.

SUMMARY

Methods and apparatus are provided for automated retouching of studio images. In various embodiments, an image retouching system comprises an image retouching machine learning system that performs a variety of operations to retouch images to match a consistent standard of appearance to enhance consumer confidence. For example, an unretouched image comprises a product item supported by a prop. The system processes this unretouched image to remove noisy backgrounds, realign the product image, adjust image aspect ratios, adjust image size, remove a base of the prop, and remove prop seams, prop joints, or other features from the image to obtain a product image having a Consistent appearance.

In one embodiment, a method is provided that includes receiving an image that shows an item and a prop. The prop supports the item and includes a joint that forms a seam that is visible in the image. The method also includes modifying the image such that the seam is not visible in the image and the item in the image is unaltered.

In one embodiment, a system is provided that comprises a memory that stores an image that shows a prop supporting an item. The prop includes a joint that forms a seam that is visible in the image. The system also comprises a computing instance configured to receive the image and modify the image such that the seam is not visible in the image while the item in the image is unaltered.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In the description and claims, terms such as "top", "bottom", "left", "right", and "side" are used to describe relative orientations between different features of an image retouching system, and it is to be understood that the overall structure being described can actually be oriented in any way in three-dimensional space. For example, when a first object is described as rotating counterclockwise, it is to be understood that the first object may in fact be rotating clockwise when viewed from a different perspective.

Figure 1:
FIG. 1 is a diagram of a product detail page (PDP).

FIG. 1 is a diagram of a product detail page (PDP) 100. The product detail page 100 displays information about an item 101 available for purchase, such as from an online ecommerce website. For example, the item 101 may be a garment or other article of clothing or any type of product. The PDP 100 is provided by a provider entity, such as a distributor, seller, reseller, Internet commerce entity, or any other marketplace entity that sells or distributes goods. The PDP 100 includes one or more images 102 of the item 101 placed on a prop or mannequin 106, price information 103, brand or designer information 104, and a description 105 of the item 101. The PDP 100 is displayed on a desktop or mobile web browser application or via a mobile application.

Figure 2:
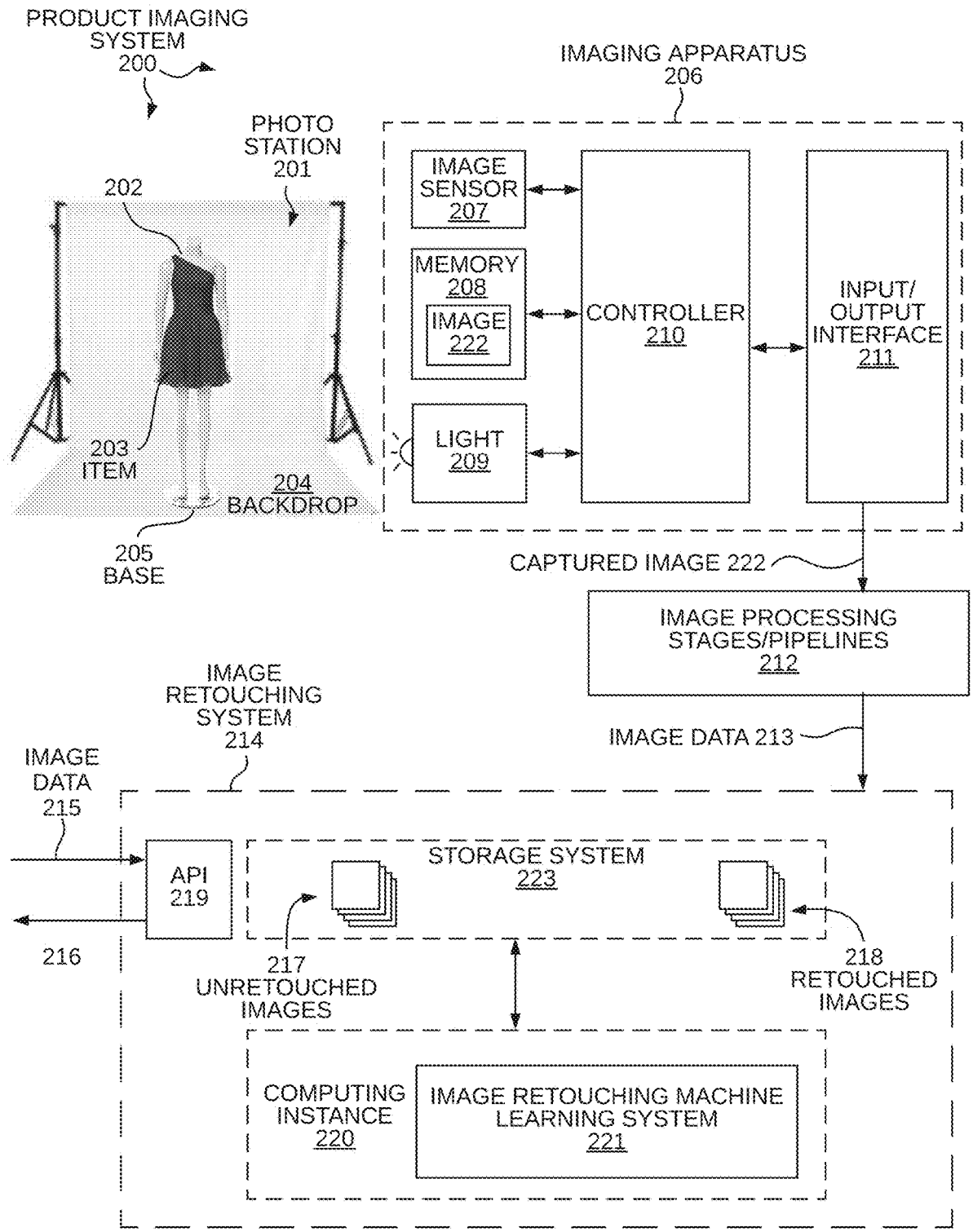
FIG. 2 is a diagram of a product imaging system constructed in accordance with one embodiment.

FIG. 2 is a diagram of a product imaging system 200 in accordance with one embodiment. The product imaging system 200 comprises a photography station 201, an imaging apparatus 206, image processing stages and pipelines 212, and an image retouching system 214.

During operation, an item 203 is placed on a prop or mannequin 202 and is photographed in the photo station 201, usually for the purpose of obtaining images that can be used to display the item 203 in a PDP, such as PDP 100, or other marketing and advertising materials. The item 203 is displayed on the mannequin 202 before a backdrop 204. The backdrop 204 is used to achieve desirable lighting conditions for photographing item 203. The mannequin 202 is supported by a base 205. In another example, item 203 is a purse and prop 202 is a stand or a table that item 203 is placed on.

The imaging apparatus 206 comprises an image sensor 207, memory 208, light 209, controller 210, and input/output interface 211. The imaging apparatus 206 includes other supporting hardware and software components not shown to simplify explanation. During photographing of item 203, the controller 210 controls image sensor 207 to capture images of item 203 and controls light 209 to provide desired lighting. A captured image 222 is stored in memory 208. The controller 210 communicates the captured image 222 to image processing stages and pipelines 212 via the input/output interface 211. The input/output interface 211 includes hardware/software for transferring the captured image 222 via a wired or wireless connection to an external system, such as the image processing stages and pipelines 212.

The image processing stages and pipelines 212 comprises all hardware and/or software to process and pipeline the captured image 222 to produce image data 213 for customer-facing usage. Image processing stages and pipelines 212 performs one or more of background removal, color correction, retouching, dropping shadows, image optimization, tagging, and other internal processes necessary to prepare the captured image 222 for commercial use. In some embodiments, the image processing stages and pipelines 212 also include physical processes by which the captured image 222 is adapted to an organization's overall operations. The image processing stages and pipelines 212 supplies the processed image data 213 to the image retouching system 214.

In one embodiment, the image retouching system 214 comprises a storage system 223, computing instance 220, and application program interface (API) 219. The computing instance 220 comprises an image retouching machine learning (ML) system 221. The computing instance 220 comprises any suitable processor capable of interpreting or executing instructions. Storage system 223 is a computer-readable medium that includes any kind of computer memory such as floppy disks, conventional hard disks, CD-ROMS, Flash ROMS, non-volatile ROM, RAM, and non-volatile memory. The API 219 comprises any suitable hardware/software capable of interfacing with external devices, such as a network link or a physical communication bus that allows wired or wireless communications between external devices and various components of the image retouching system 214.

The image retouching system 214 receives the image data 213 from the image processing stages and pipelines 212 and stores the image data 213 as unretouched images 217 in the storage system 223. The image retouching system 214 can also receive image data 215 through the API 219 and store the image data 215 as unretouched images 217 in the storage system 223. The machine learning system 221 is configured to dynamically retouch the unretouched images 217 to generate retouched images 218 that are also stored in the storage system 223 and/or provided through the API 219 as retouched image 216.

In the embodiment shown in FIG. 2, the computing instance 220, the machine learning system 221, and the storage system 223 are integrated into the image retouching system 214. It is understood that in another embodiment, one or more of the computing instance 220, machine learning system 221, or storage system 223 is distributed across a network as part of a distributed system architecture. For example, the computing instance 220 can be one or more cloud computing instances, the storage system 223 can be cloud storage, and the machine learning system 221 can be one or more computational services operating in a cloud environment. In one embodiment, the machine learning system 221 is a computational structure that is stored partly or entirely in storage system 223.

Figure 3:
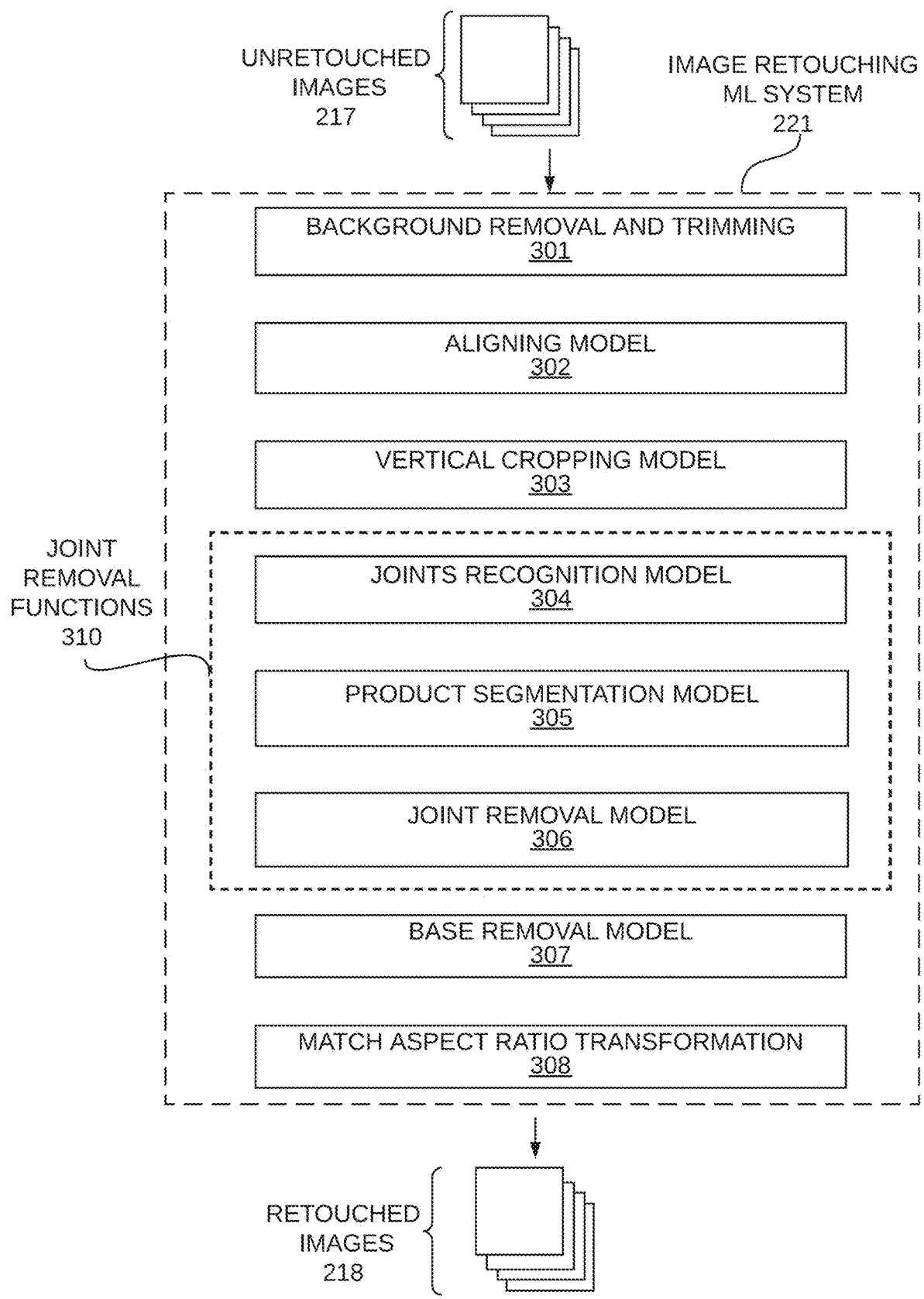
FIG. 3 is a diagram of functions performed by an image retouching ML system shown in FIG. 2.

FIG. 3 is a diagram of functions performed by the image retouching ML system 221 shown in FIG. 2. During operation, image data 213 is received from the image processing stages/pipelines 212 or image data 215 is received through the API 219. The received images are stored as unretouched images 217 in the storage system 223. Retouching of the unretouched images 217 is performed by the image retouching (ML) system 221, which performs the following functions.

At function 301, an image background is removed and the image is trimmed from the top, bottom, left, and right sides. For example, after background removal and trimming, only the item, the prop, and a small amount of background are visible in the image.

Figure 8:
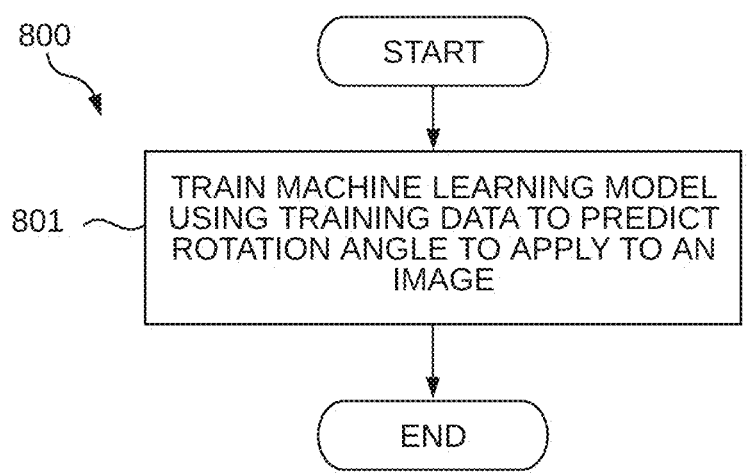
FIG. 8 is a flowchart of a method for image alignment in accordance with another novel aspect.
Figure 9:
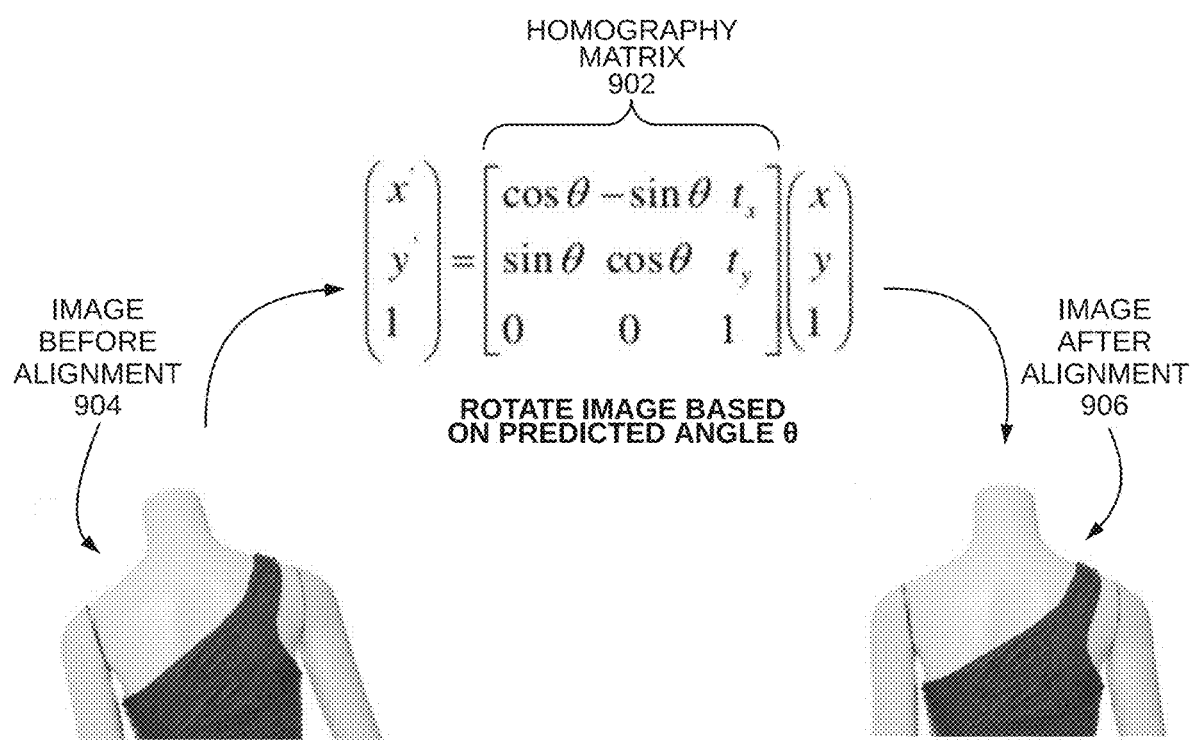
FIG. 9 shows an example of image transformation to achieve the operation of alignment.
Figure 10:
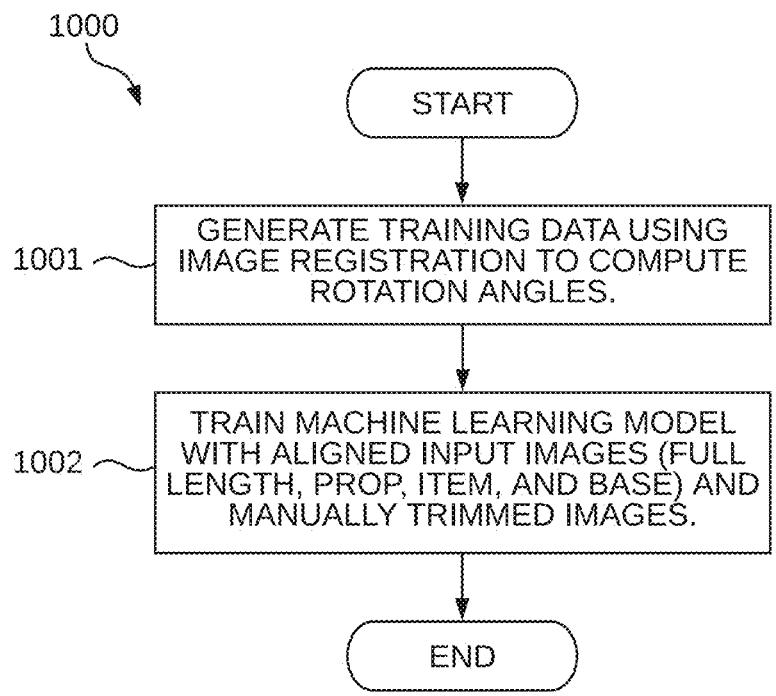
FIG. 10 is a flowchart of a method for training a machine learning model in accordance with another novel aspect.

At function 302, an aligning model is used to align the item and the prop in the trimmed image. In one embodiment, the aligning model is a neural network model that is trained to align the item and prop so that the item and the prop are centered in the trimmed image. More detail of the operations of aligning model 302 is shown in FIGS. 8-10.

Figure 11:
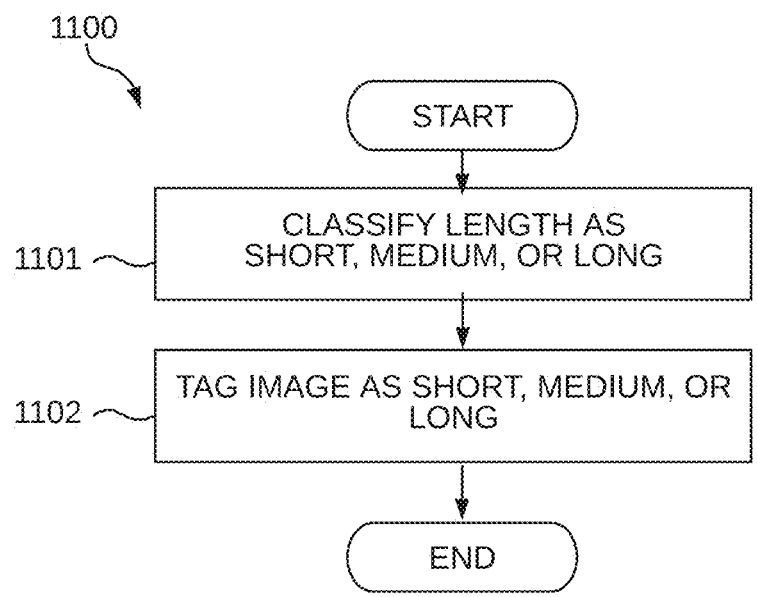
FIG. 11 is a flowchart of a method for classifying product dimensions in accordance with another novel aspect.
Figure 12:
FIG. 12 illustrates a vertically cropped image.

At function 303, a vertical cropping model is used to predict the product length of the aligned image of the item and the prop. In one embodiment, the product length is predicted but the actual cropping of the image occurs at function 307. In one embodiment, the vertical cropping model comprises a ResNet model that is used to predict the product length as one of short, medium, and long. More detail of the operations of the vertical cropping model is shown in FIGS. 11-12.

Next, several functions are performed that are referred to as joint removal functions 310, which are used to remove joints or seams of the prop that appear in the vertically cropped image and are described in more details as follows.

Figure 13:
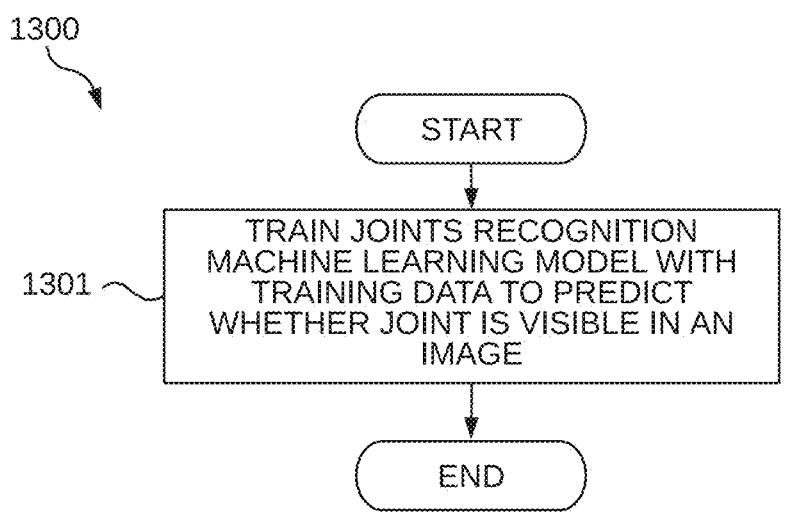
FIG. 13 is a flowchart of a method for training a joint recognition model in accordance with one novel aspect.

At function 304, a joints recognition model 304 is used to recognize or identify joints of the prop or mannequin that are visible in the image. For example, there may be a visible joint or seam where the mannequin's arm connects to the mannequin's shoulder. The joints recognition model 304 determines if a joint is visible or not in selected areas of the image. More detail of the operations of joints recognition model 304 is shown in FIG. 13.

Figure 14:
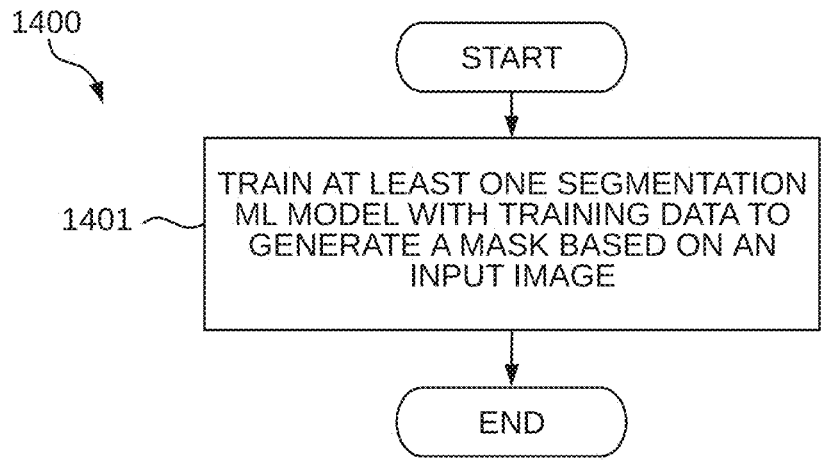
FIG. 14 is a flowchart of a method for training a segmentation model in accordance with one novel aspect.

At function 305, a product segmentation model is used to segment the image of the prop or mannequin into multiple images that include multiple masks. For example, the segmentation model provides a mask for joints, a mask for the item, a mask for the mannequin, and a mask for the background. More detail of the operations of product segmentation model 305 is shown in FIG. 14.

Figure 15:
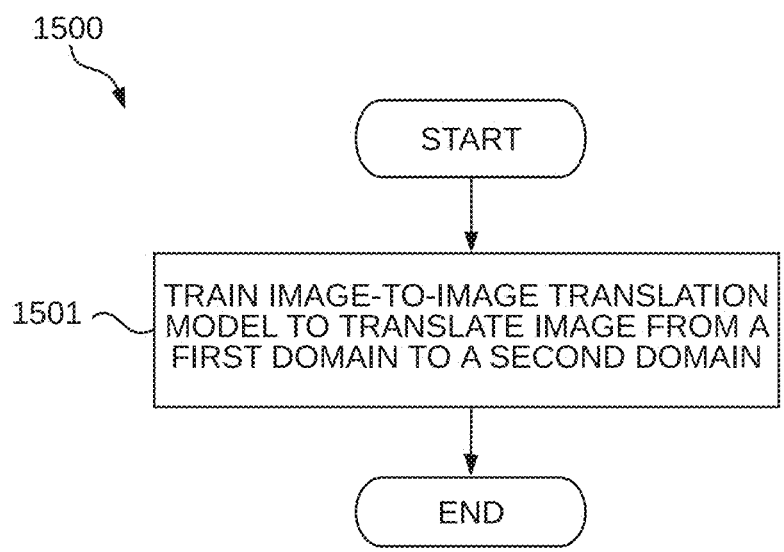
FIG. 15 is a flowchart of a method for training a feature removal model in accordance with one novel aspect.
Figure 16:
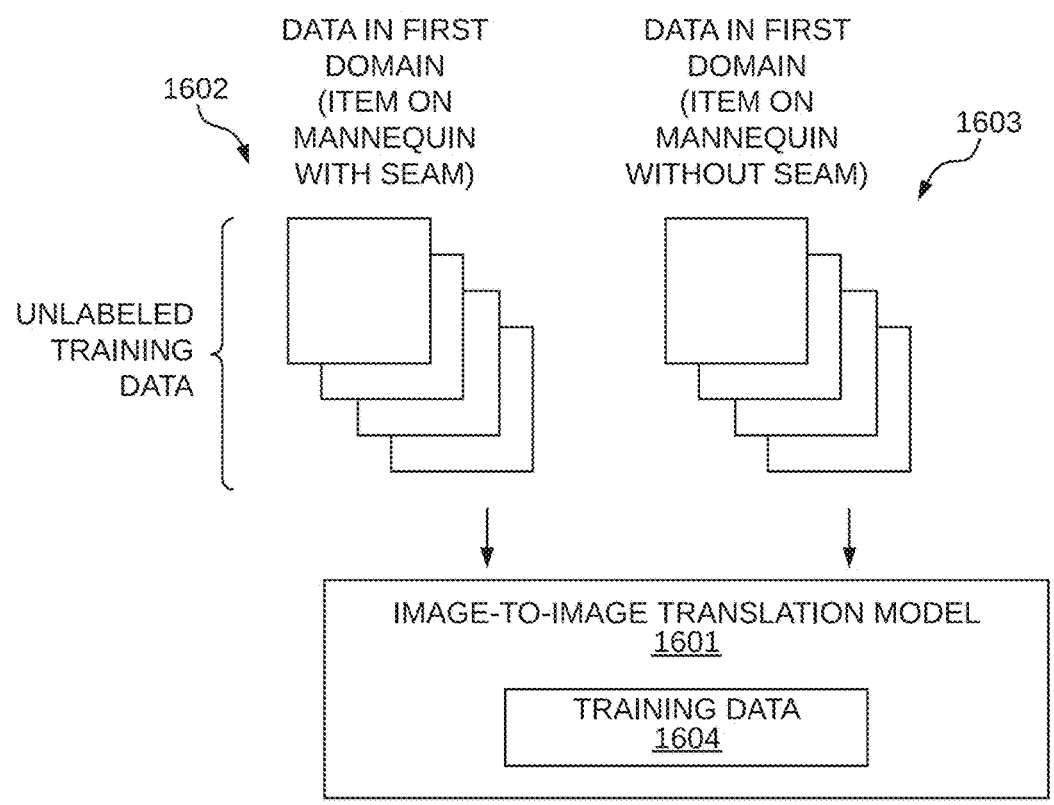
FIG. 16 shows a diagram that illustrates training of an image translation model for feature removal in accordance with one novel aspect.
Figure 17:
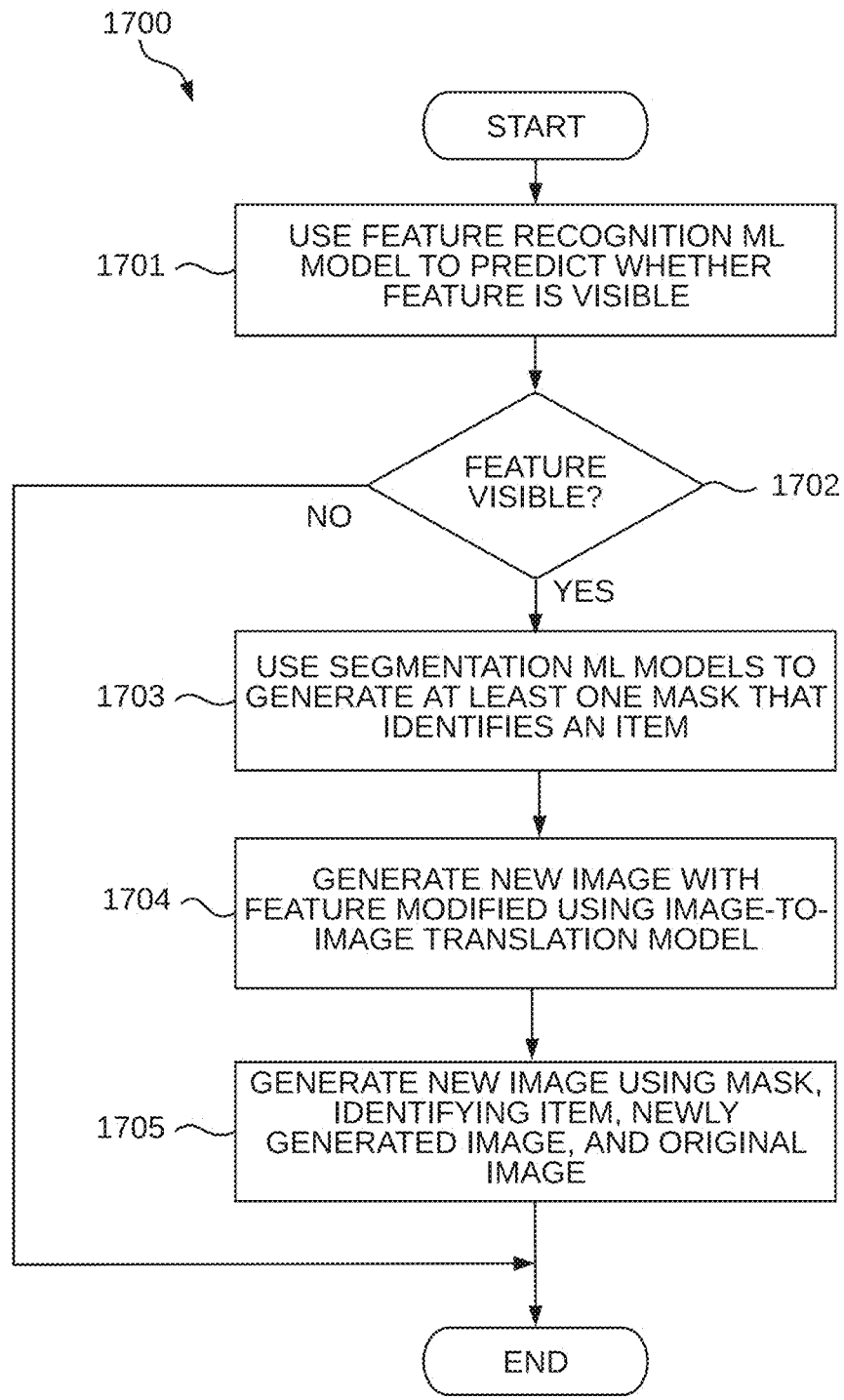
FIG. 17 is a flowchart of a method for modifying a feature in an image in accordance with another novel aspect.

At function 306, a joint removal model is used to remove any joints that have been identified in the image by the joints recognition model 304. More detail of the operations of joint removal model 306 is shown in FIGS. 15-17.

At function 307, a base removal model is used to remove a base from the image. For example, a base that is part of the prop may be included in the image. The base removal model operates to remove the base from the image.

At function 308, an aspect ratio transformation is performed to adjust the aspect ratio of the image. For example, the aspect ratio of the image may be adjusted to match other images or to conform to a particular size requirement. After completion of the aspect ratio transformation, a resulting retouched image 218 is produced.

Figure 4:
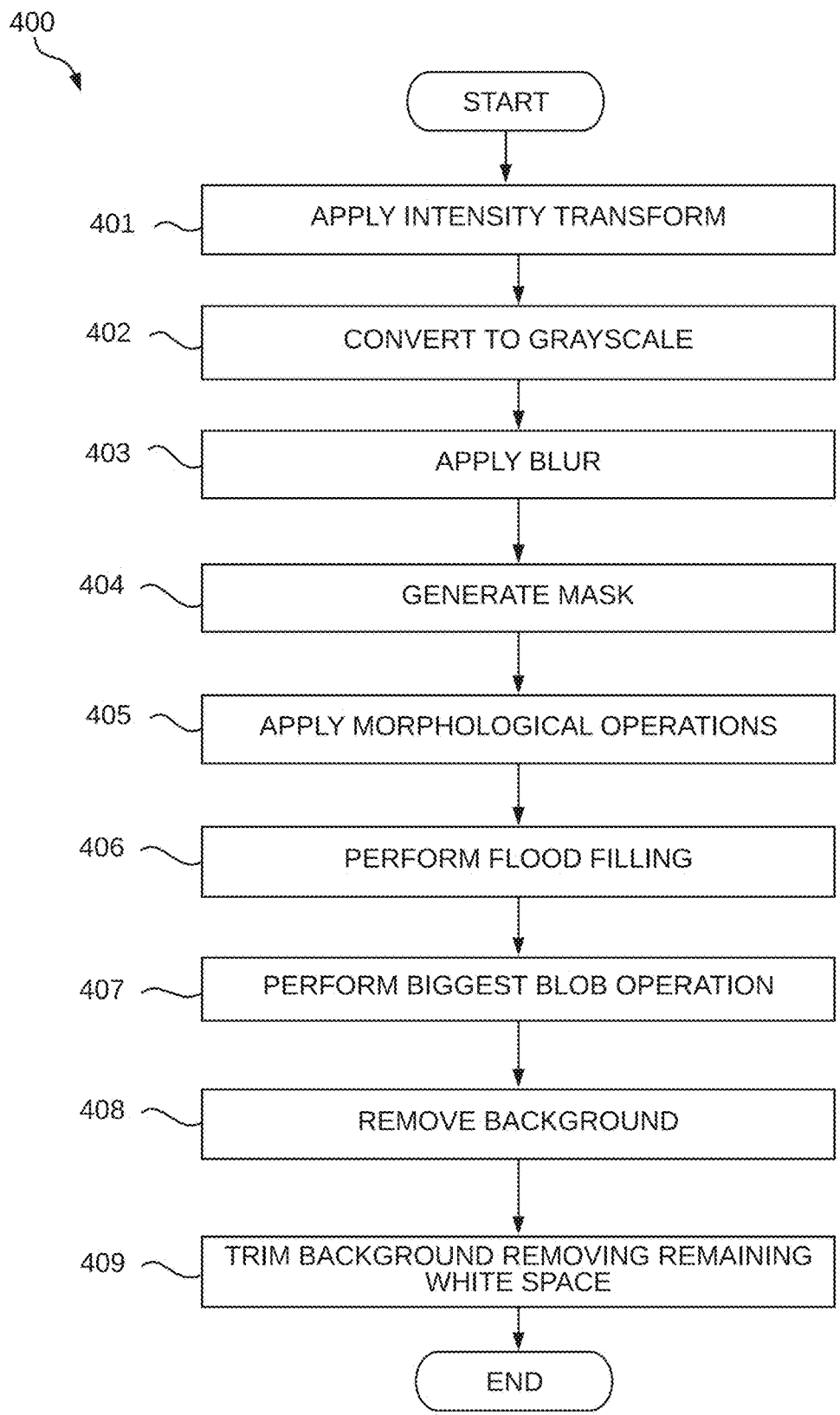
FIG. 4 is a diagram of functions performed by the image retouching ML system shown in FIG. 2.

FIG. 4 shows operations of function 301 performed by the image retouching ML system 221 shown in FIG. 2 to perform operations of background removal and trimming of an image.

At step 401, an intensity transform is applied to the image to separate dark colors from lighter colors.

At step 402, the intensity-transformed image is converted to grayscale, which changes the image to black and white.

At step 403, a blurring operation is performed by applying gaussian noise to the grayscale image.

At step 404, a thresholding operation is performed to generate a mask from the blurred image.

At step 405, morphological operations, such as dilation and/or erosion operations, are performed on the mask to produce a mask having a safety buffer that is slightly larger than the prop in the image.

At step 406, a flood-filling operation is performed to fill and thereby remove holes from the mask within the safety buffer.

At step 407, a biggest blob operation is performed on the mask after flood filling to select the largest blob in the mask, which must include an item and a prop.

At block 408, the mask is applied to the image and the background is removed from the image as the region outside of the biggest blob of the mask to generate a background-removed image.

At block 409, the resulting background-removed image is trimmed to remove any remaining white space.

Thus, method 400 performs operations of the function 301 for background removal and trimming in accordance with one aspect. It should be noted that the operations of method 400 are exemplary and that the operations can be added to, deleted, rearranged, or otherwise modified within the scope of the embodiments. In another embodiment, the background removal and trimming of the image in 301 is performed using one or more machine learning models.

Figure 5:
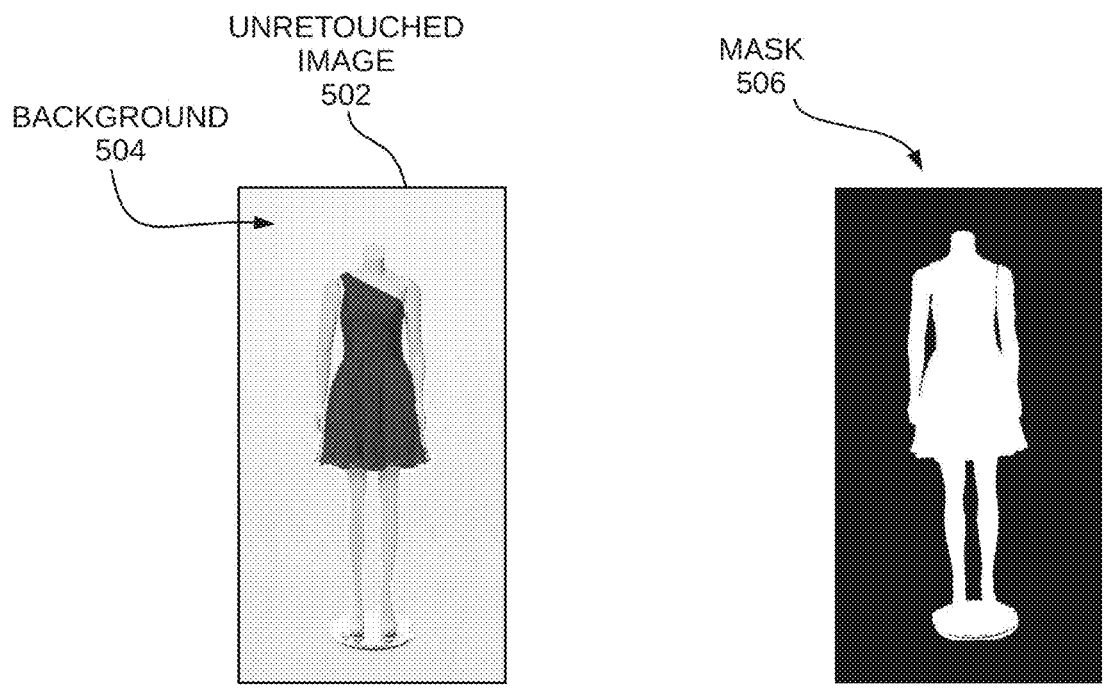
FIG. 5 shows images that represent the operations performed in the method shown in FIG. 4.

FIG. 5 shows images that represent the operations performed at steps 401 to 407 of method 400. An unretouched image 502 is processed starting at step 401. The image 502 includes background 504. The steps 401 to 407 are performed on the image 502 to produce the mask 506.

Figure 6:
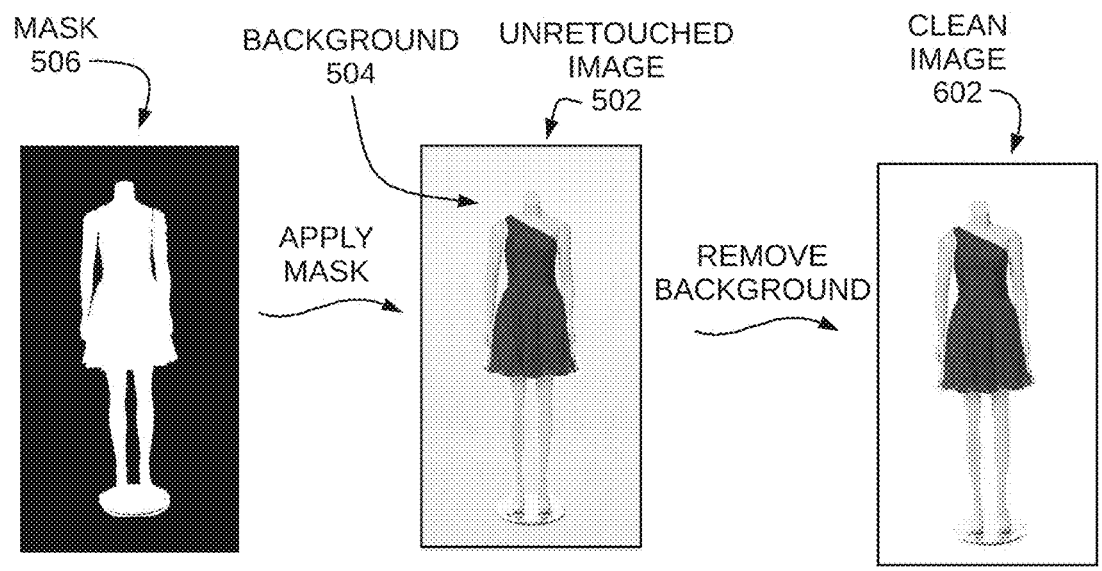
FIG. 6 shows images that represent the operations performed in the method shown in FIG. 4.

FIG. 6 shows images that represent the operations performed at step 408 of method 400. The mask 506, generated at the completion of step 407, is applied to the unretouched image 502 to remove the background 504, resulting in a clean image 602 that shows an item, a prop, and a completely white background due to the masking of the original background.

Figure 7:
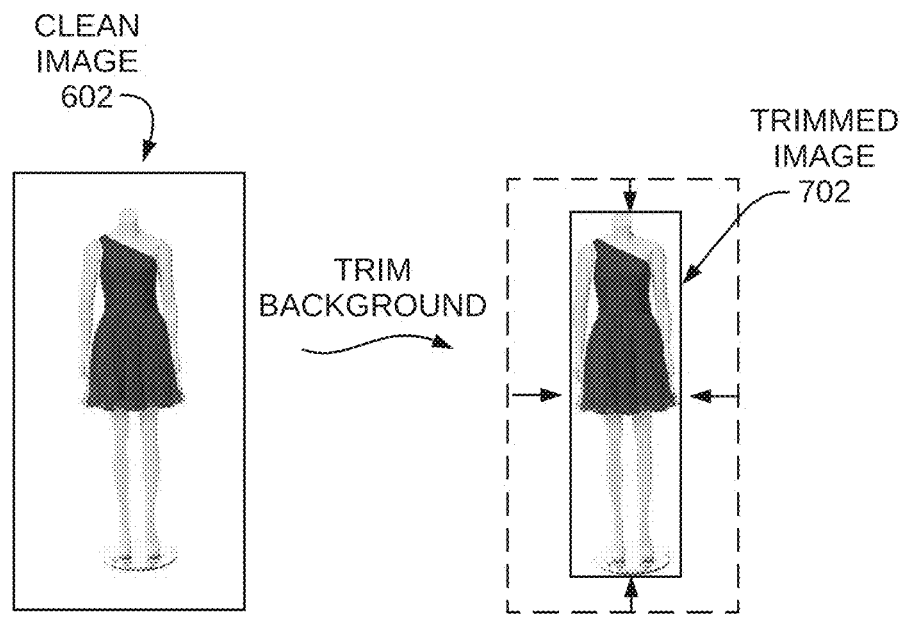
FIG. 7 shows images that represent the operations performed in the method shown in FIG. 4.

FIG. 7 shows images that represent the operations performed at step 409 of method 400. As illustrated in FIG. 7, the clean image 602 is trimmed to trim away the background by removing the white space around all four sides of the image to leave just the item, the prop, and a small amount of the clean background. For example, the trimming is performed from the top, bottom, left, and right sides to generate a trimmed image 702.

FIG. 8 is a flowchart of a method 800 in accordance with another novel aspect. Method 800 performs the operations of function 302 described above. In a first step (step 801), a machine learning (ML) model is trained using historical data from previous alignments to predict a rotation angle theta (θ) to apply to an image. For example, image registrations from previous alignments are used to train the ML model. In one example, the ML model is a Residual Network (ResNet) ML model.

FIG. 9 shows an example of an image transformation operation that is used as part of the operations of the aligning model 302 to align an image. In one embodiment, a homography matrix 902 is used to rotate an image based on a predicted rotation angle theta (θ) that is predicted by the ML model trained at block 801. Thus, the homography matrix 902 is applied to the image 904 to rotate the image 904 to obtain an aligned image 906.

FIG. 10 is a flowchart of a method 1000 in accordance with another novel aspect. In a first step (step 1001), training data is generated to compute a rotation angle by image registration using both the retouched and unretouched images.

In a second step (step 1002), a machine learning model is trained with aligned input images (full length, prop, item, and base) and manually trimmed images. In one example, the ML model is a ResNet ML model that is used to process images related to men's clothing, apparel, headwear, footwear, and accessories. In another example, the ML model is a convolutional neural network (CNN) ML model that is used to process images related to womens women's clothing, apparel, headwear, footwear, and accessories.

FIG. 11 is a flowchart of a method 1100 to tag an image length in accordance with another novel aspect. In a first step (step 1101), the length of an item is classified (or predicted) as being one of short, medium, or long. In a second step (step 1102), an image is tagged as one of short, medium, or long. In one example, no cropping is performed at this stage and is delayed for a later time because the base of the prop introduces significant noise.

FIG. 12 illustrates how a medium length product will be vertically cropped. For example, the product image is classified as medium length and is (or will be) cropped to represent the medium length classification.

FIG. 13 is a flowchart of a method 1300 for training a joints recognition model in accordance with one novel aspect. In a first step (step 1301), a joint recognition ML model is trained with training data to predict whether a joint (e.g., seam) of a prop is visible in an item image that has the background removed and item aligned. For example, in one embodiment, the prediction is based on the image output from the aligning model 302.

FIG. 14 is a flowchart of a method 1400 for training a product segmentation model in accordance with one novel aspect. In a first step (step 1401), a product segmentation ML model is trained with training data to predict four segmented masks.

FIG. 15 is a flowchart of a method 1500 for training an image-to-image translation model for feature removal in accordance with one novel aspect. In a first step (step 1501), images with seams and images with seams healed are used to train the image translation ML model. In one embodiment, the image translation model is a CycleGAN model.

In one embodiment, image translation using a CycleGAN model occurs in a paired dataset where a first image in a source domain is mapped to a second image in a target domain, such that the images share various features that can be used to perform the mapping operation. Thus, pairing is performed to make the input and output images share some common features to define the transformation from one domain to another domain. In another embodiment, an unpaired dataset is used where there is no predefined meaningful transformation. Such a transformation will need to be created so that there is some meaningful relation between input image and generated image. To accomplish this, a first generator is configured to map an input image from a first domain to an output image in a target domain. The images share some features that can be used to map the output image back to input image, so there is a second generator configured to map the output image back to the original input. Thus, a meaningful mapping between the input and output images is established.

FIG. 16 shows a diagram that illustrates training of an image translation model for feature removal in accordance with one novel aspect. In one embodiment, an image-to-image translation model 1601 receives unlabeled training data comprising image data in a first domain 1602 having a feature or seam, and image data in the first domain without the feature or seam 1603. The model 1601 computes an image-to-image translation and generates training data 1604 that can be used in future translations.

FIG. 17 is a flowchart of a method 1700 for modifying a feature in an image in accordance with another novel aspect. In a first step (step 1701), a feature recognition ML model is used to predict whether a feature (e.g., joint or seam) is visible in an image.

In a second step (step 1702), a determination is made as to whether the feature is visible. If it is determined that the feature is visible, then the method proceeds to block 1703. If, on the other hand, it is determined that the feature is not visible, then the method ends.

In a third step (step 1703), a segmentation ML model is used to generate at least one mask. In one embodiment, four masks are generated that comprise a Joints mask, Product mask, Background mask, and Mannequin mask. The reason that four segmented masks are generated is to make sure that no pixels in the product image are changed in the process of removing the visible joints.

In a fourth step (step 1704), a new image with the feature modified is generated using an image-to-image translation model, as shown in FIG. 16. In one embodiment, the image-to-image translation model is a CycleGAN model. A CycleGAN model operates to solve image-to-image translation problems. The goal of the image-to-image translation is to learn the mapping between an input image and an output image using training data of aligned or unaligned image pairs as described above.

In a fifth step (step 1705), the new image is generated using a mask, the identifying item, the generated image and the original image. In one embodiment, a new image is computed that is a weighted average of original (seam visible) and healed images. The reason is to produce a smooth, natural transition between the healed seam area and the original image. The operations are performed using the Product mask to leave product pixels unaltered.

Figure 18:
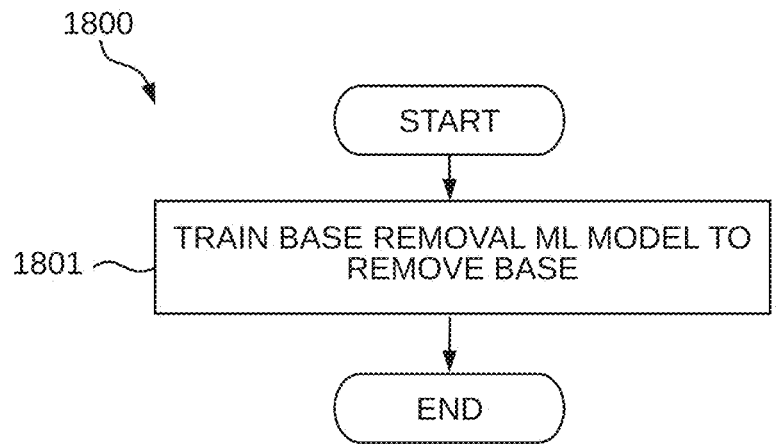
FIG. 18 is a flowchart of a method for removing a visible joint in an image in accordance with another novel aspect.

FIG. 18 is a flowchart of a method 1800 for training a base removal model in accordance with one novel aspect. In a first step (step 1801), a base removal ML model is trained to remove a base of a prop. In one embodiment, the base removal models are U-Nets with a custom implementation of pixel weight-maps.

Figure 19:
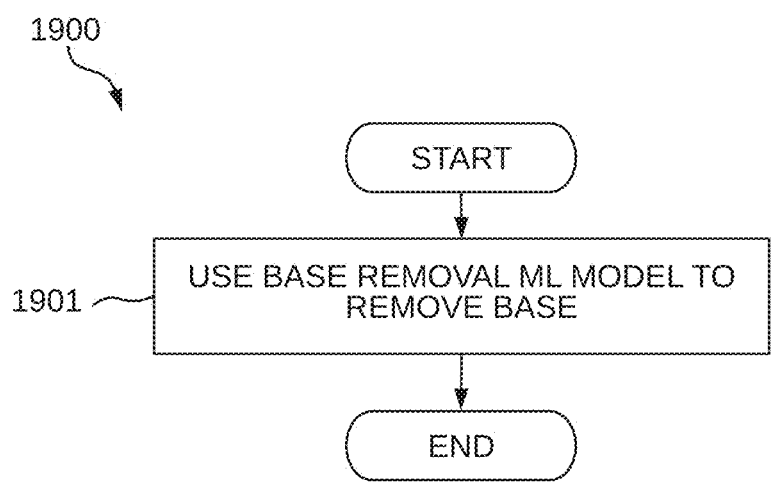
FIG. 19 is a flowchart of a method for training a base removal model in accordance with one novel aspect.

FIG. 19 is a flowchart of a method 1900 for removing a base of a prop in accordance with one novel aspect. In a first step (step 1901), a trained base removal ML model is used to remove a base of the prop in the image.

Figure 20:
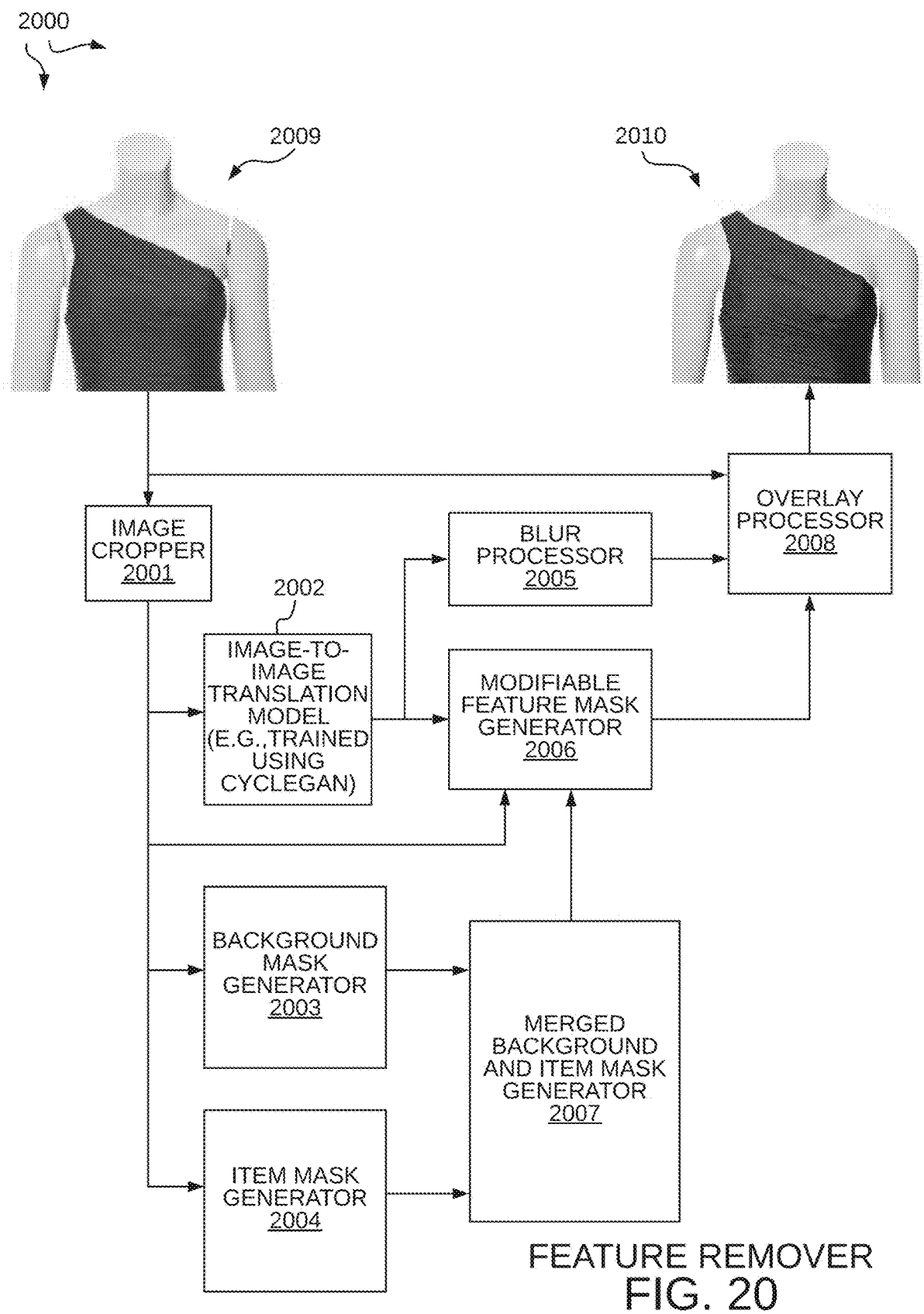
FIG. 20 is a flowchart of a method for removing a base of a prop in accordance with one novel aspect.

FIG. 20 is a diagram of a feature remover 2000.

The feature remover 2000 comprises image cropper 2001, image-to-image translation model 2002, background mask generator 2003, item mask generator 2004, blur processor 2005, modifiable feature mask generator 2006, merged mask generator 2007, and image overlay processor 2008. During operation, the feature remover 2000 receives an image 2009 having a feature and operates to generate a retouched image 2010 with the feature removed. For example, in one embodiment, the feature is a visible seam or joint in a prop. In an alternative embodiment, the background mask generator 2003 is not used so that the output of the merged mask generator 2007 is just the item mask output from the item mask generator 2004.

Figure 21:
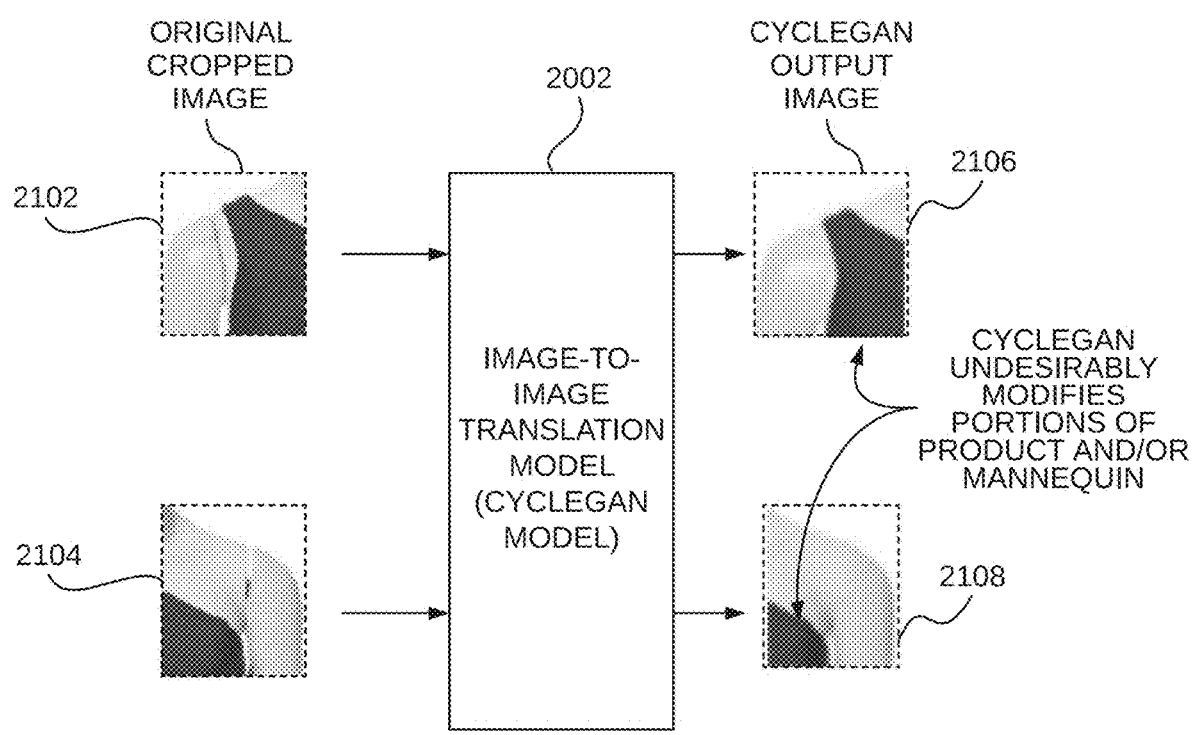
FIG. 21 is a diagram of a feature remover.

FIG. 21 shows operations of the image-to-image translation model 2002 shown in FIG. 20. In one embodiment, the image-to-image translation model 2002 is a CycleGAN model. During operation, original cropped product images 2102 and 2104 are processed by the CycleGAN model 2002 to generate images 2106 and 2108, respectively, which have features removed but that may have undesirably modified portions of the product and/or the prop (mannequin).

In one embodiment, image cropper 2001 crops original images to produce cropped image portions 2102 and 2104. The CycleGAN model 2002 processes the cropped image portions 2102 and 2104 to produce processed image portions 2106 and 2108, respectively. As illustrated in FIG. 21, processing by the CycleGAN model 2002 may result in undesirable effects in the processed images.

Figure 22:
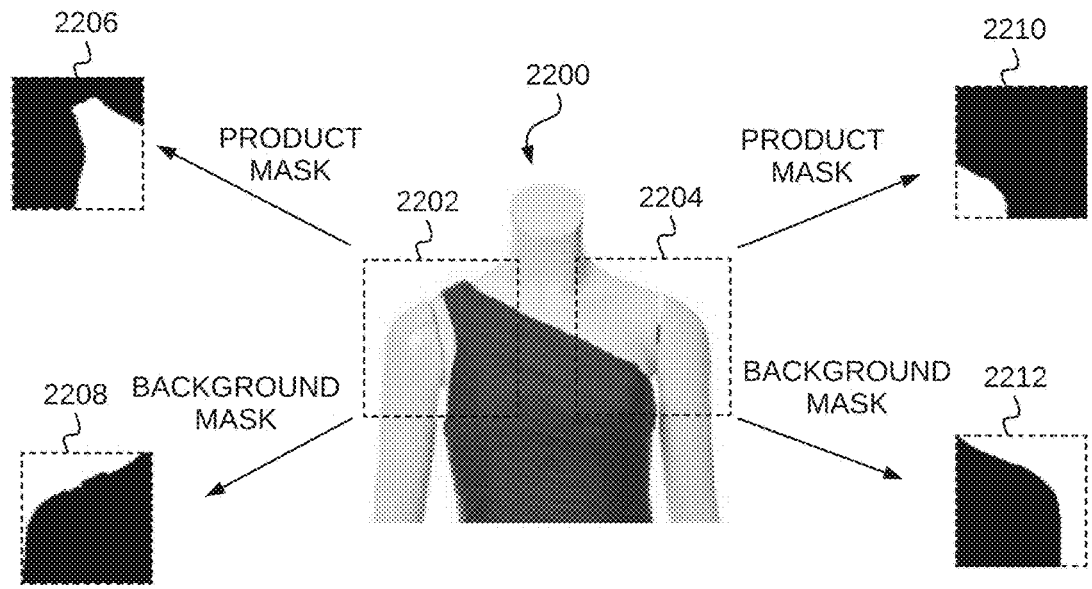
FIG. 22 shows how product and background masks are generated at the feature remover shown in FIG. 20.

FIG. 22 shows how product and background masks are generated at blocks 2003 and 2004 of the feature remover 2000 shown in FIG. 20. For example, regions 2202 and 2204 of an image 2200 are defined. The region 2202 is used to generate product mask 2206 and background mask 2208. The region 2204 is used to generate product mask 2210 and background mask 2212.

Figure 23:
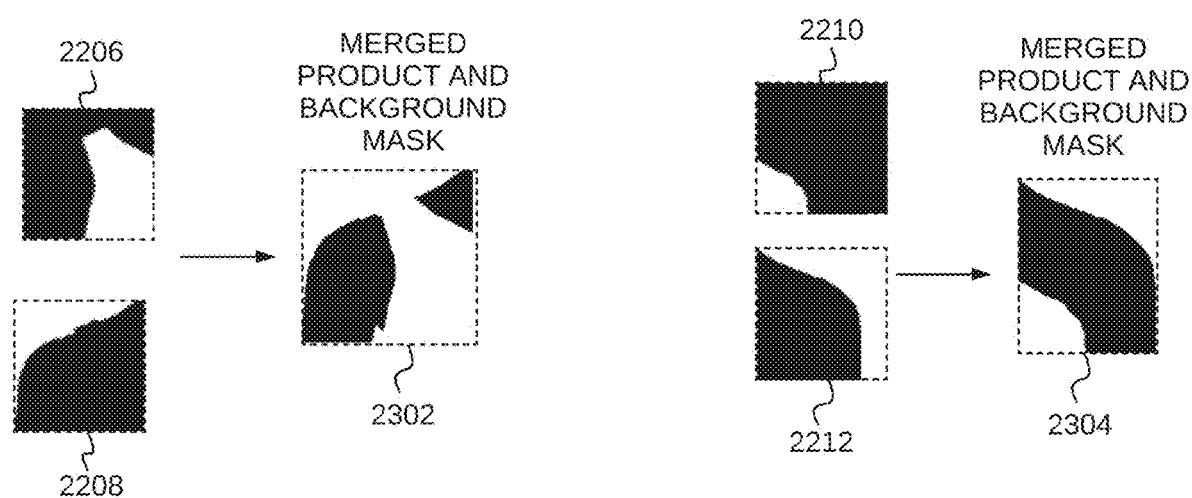
FIG. 23 shows how product and background masks are merged at the feature remover shown in FIG. 20.

FIG. 23 shows how product and background masks are merged at block 2007 of the feature remover 2000 shown in FIG. 20. In one embodiment, the product mask 2206 is merged with the background mask 2208 to form a merged product and background mask 2302. In addition, the product mask 2210 is merged with the background mask 2212 to form a merged product and background mask 2304.

Figure 24:
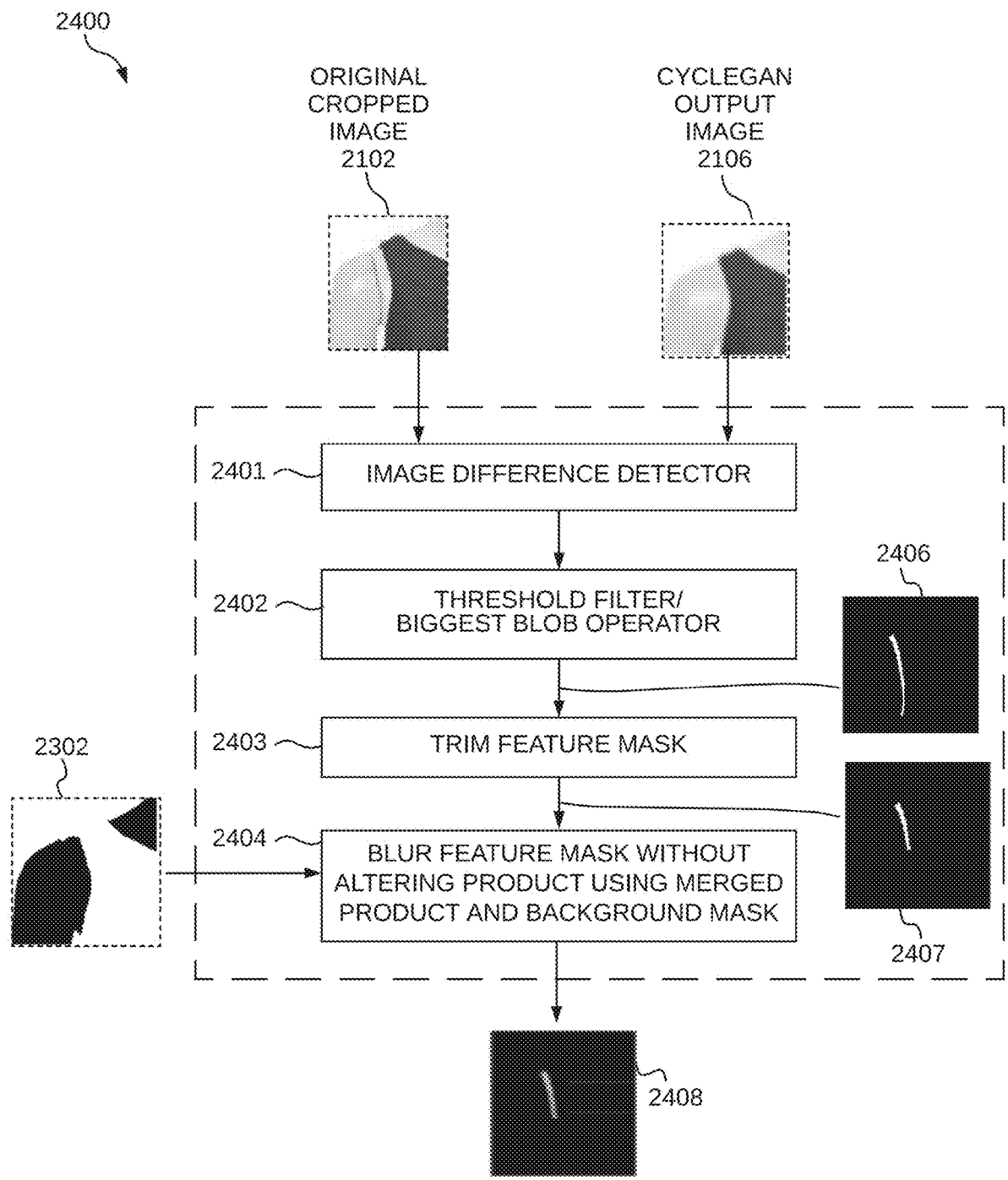
FIG. 24 is a diagram of a method for operating a modifiable feature mask generator.

FIG. 24 is a diagram of a method 2400 for operating a modifiable feature mask generator. The method 2400 is suitable for use with the modifiable feature mask generator 2006 shown in FIG. 20.

At block 2401, image difference detection is performed on a cropped image and a CycleGAN output image. For example, the image difference detection is performed on the cropped image 2102 and the CycleGAN output image 2106.

At block 2402, the image difference generated at block 2401 is filtered and then a biggest blob is detected within the image. For example, a result of the filtering and blob detection at block 2402 is shown in the image 2406.

At block 2403, a feature mask modification is performed to modify the feature mask image 2406 to produce the image 2407.

At block 2404, image blurring or blending is applied to the modified feature mask, using the merged product and background mask 2302, to produce the image 2408.

Figure 25:
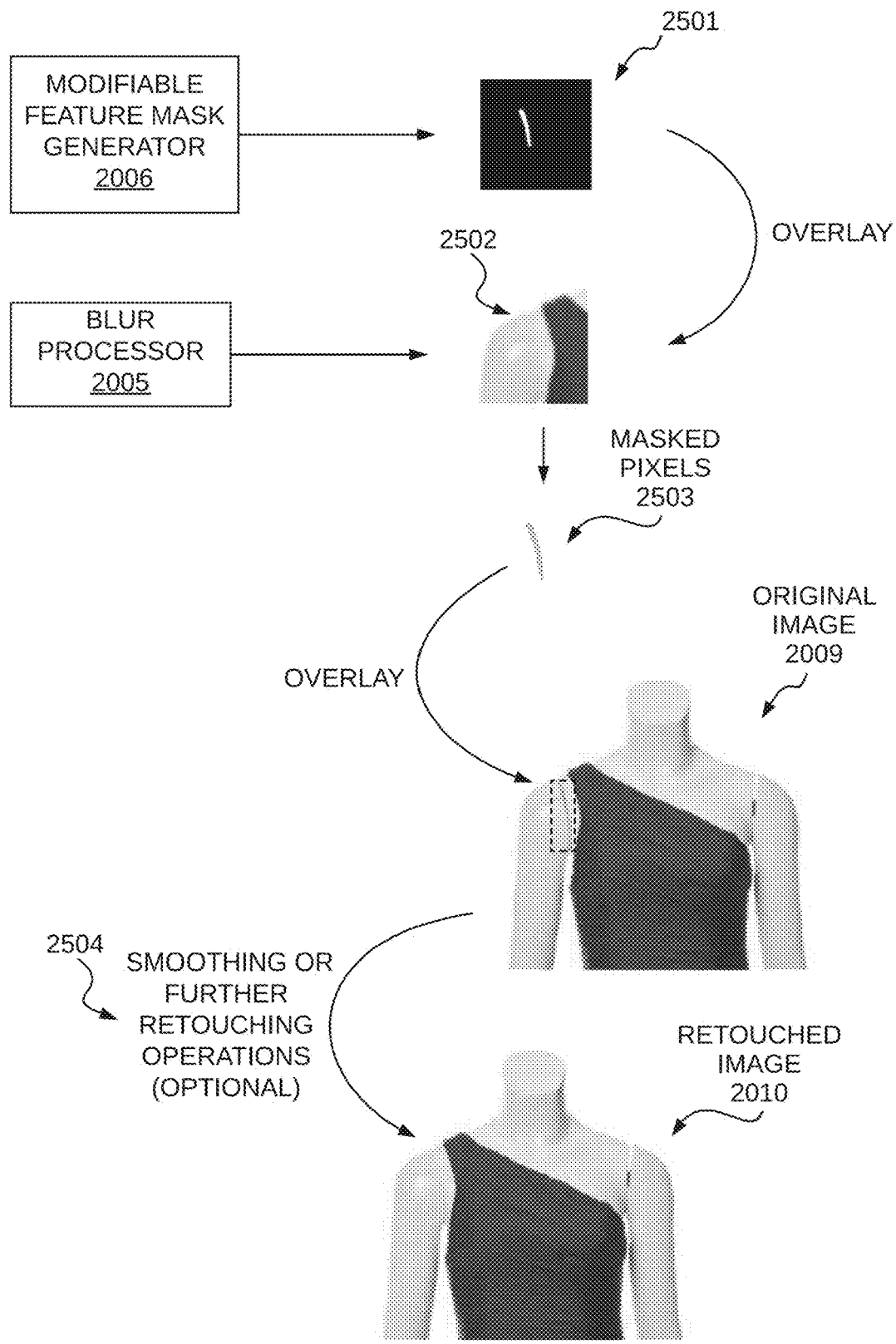
FIG. 25 is a diagram showing operation of an image overlay processor to generate a retouched image.

FIG. 25 is a diagram showing operation of the image overlay processor 2008 to generate a retouched image. The output of the feature mask generator 2006 is shown at 2501, and this mask is overlaid over the output of the blur processor 2005 as shown at 2502. The resulting masked pixels 2503 are then overlaid over the original image 2009 to generate the retouched image 2010. In an optional step, smoothing or further retouching as shown at 2504 can be performed.

Figure 26:
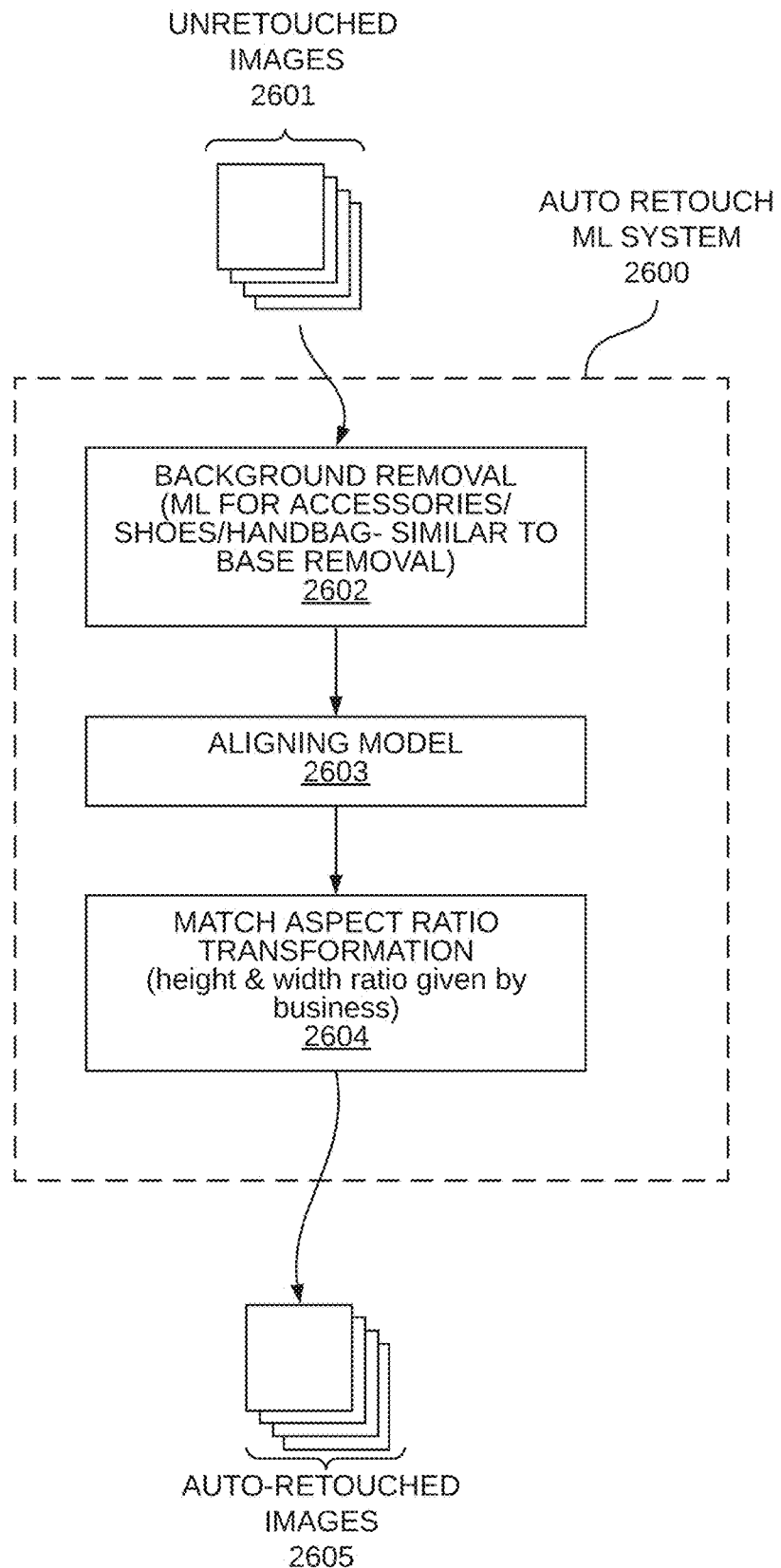
FIG. 26 shows an auto-retouch ML system.

FIG. 26 shows an auto-retouch ML system 2600. In one embodiment, the auto retouch ML system 2600 comprises background remover 2602, aligning model 2603, and aspect ratio transformer 2604.

In one embodiment, unretouched images 2601 are input to the background remover 2602 to remove an image background. The output of the background remover 2602 is input to the aligning model 2603 to align a product image.

The output of the aligning model 2603 is input to the aspect ratio transformer 2604 that operates to match aspect ratios to produce auto-retouched images 2605.

Figure 27:
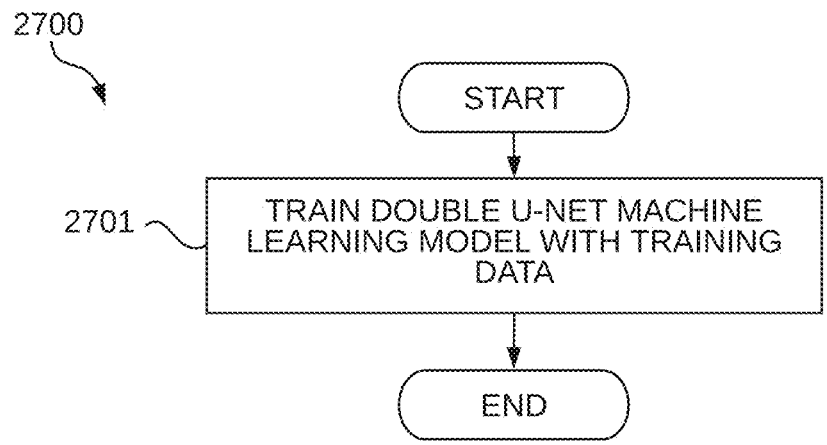
FIG. 27 is a flowchart of a method to train a double U-NET ML model in accordance with one novel aspect.

FIG. 27 is a flowchart of a method 2700 to train a double U-NET ML model in accordance with one novel aspect. In a first step (step 2701), a double U-NET machine learning model is trained with training data.

Figure 28:
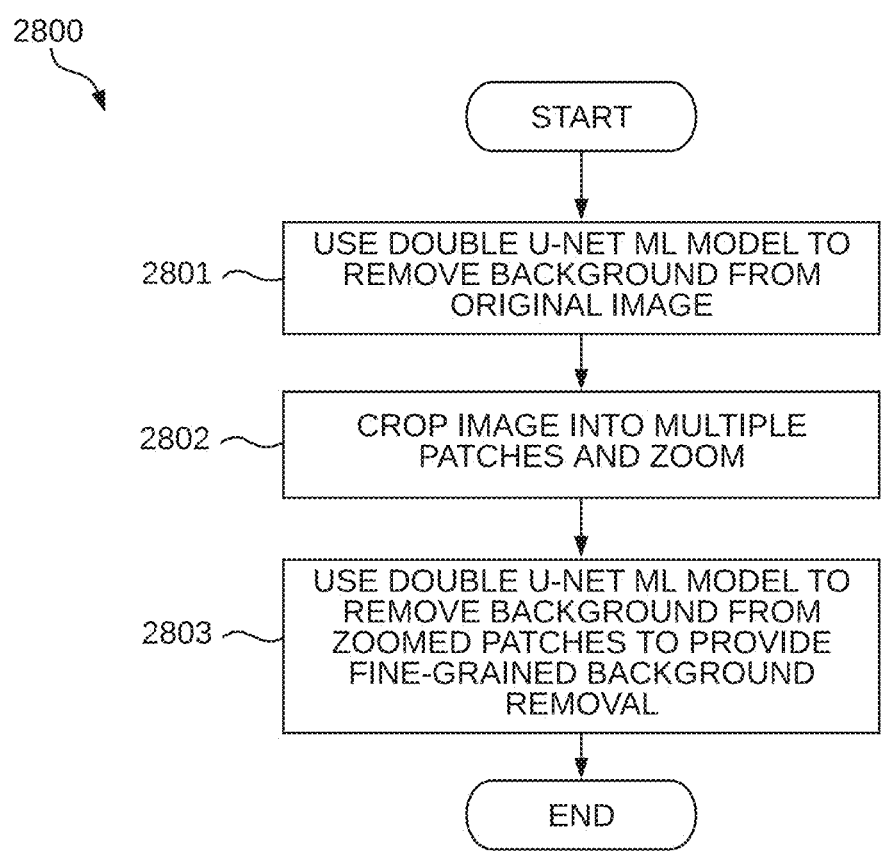
FIG. 28 is a flowchart of a method for utilizing a trained double U-NET ML model in accordance with one novel aspect.

FIG. 28 is a flowchart of a method 2800 for utilizing a trained double U-NET ML model in accordance with one novel aspect. For example, the method 2800 can be used to remove background information from small items such as scarfs and shoes.

In a first step (step 2801), a trained double U-NET ML model is used to remove background from an original image.

In a second step (step 2802), the image is cropped into multiple patches and each patched is zoomed.

In a third step (step 2803), a trained double U-NET ML model is used to remove background from the zoomed patches to provide fine-grained background removal.

Figure 29:
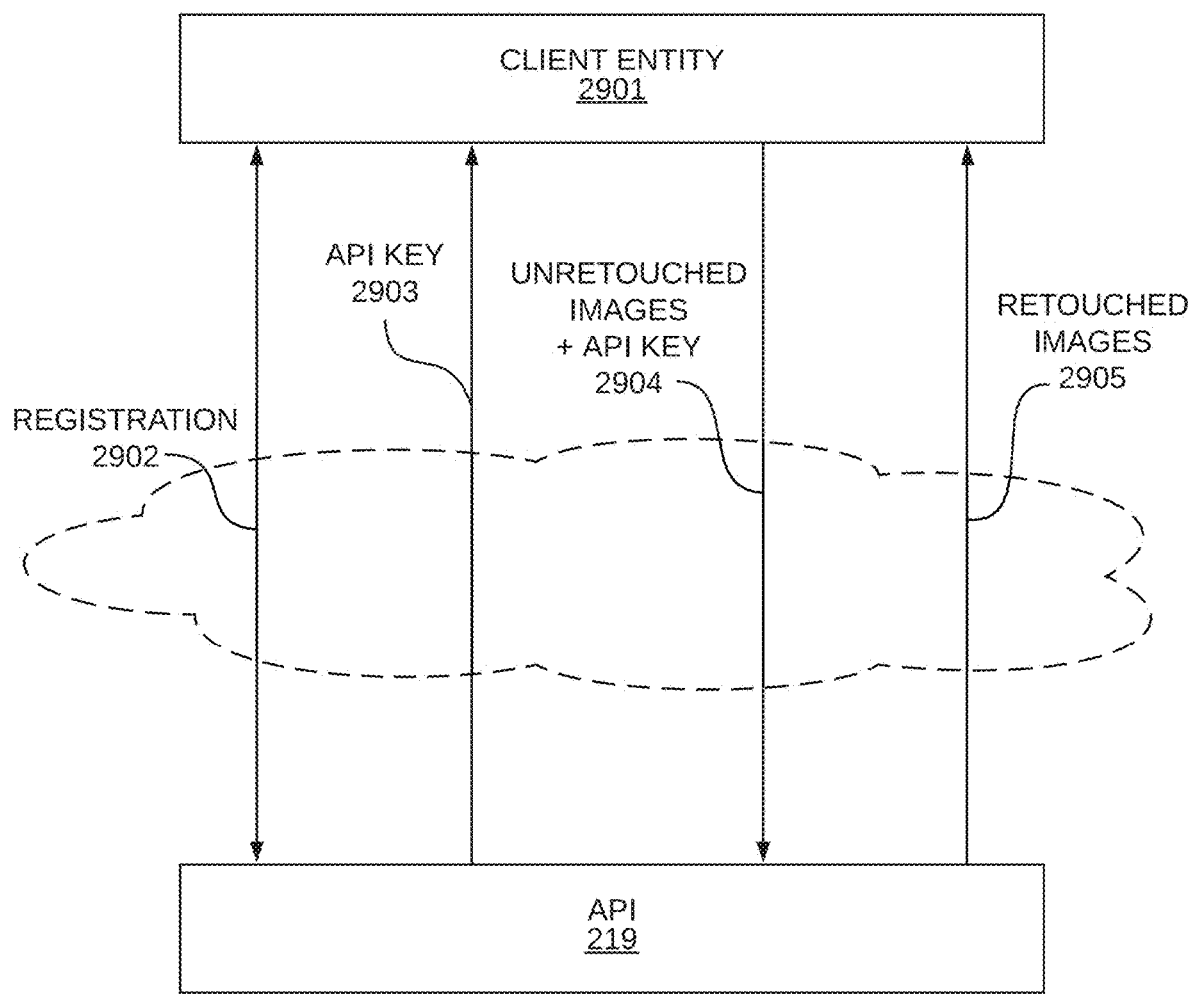
FIG. 29 shows operation of an embodiment of an application programming interface.

FIG. 29 shows operation of an embodiment of the API 219. In one embodiment, a client entity 2901 performs a registration process 2902 with the API 219. After registration, the API 219 responds by sending an API key 2903 to the client entity 2901, which can be used by the client entity 2901 to access image retouching system 214. The client entity 2901 sends unretouched images (along with the API key) 2904 to the API 219 so that the unretouched images can be processed by the image retouching system 214. After processing the unretouched images, the image retouching system 214 responds by sending retouched images 2905 back to the client entity 2901.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
receiving an image of an item and a prop, wherein the prop supports the item, wherein the prop includes a joint, and wherein the joint includes a seam that is visible in the image; and
modifying the image such that the seam of the joint is not visible in the image without altering portions of the image showing the item, wherein the prop is a mannequin, wherein the joint is a shoulder joint, and wherein the modifying of shoulder joint portions of the image comprises:
using a trained convolutional neural network to identify the shoulder joint portions in the image;
using an image segmentation model to identify the item in the image;
removing the joint portions using a generative adversarial network, wherein the generative adversarial network (GAN) generates a second image with the shoulder joint portions modified; and
combining the second image with the image.

2. The method of claim 1, further comprising:
modifying the image to remove a background.

3. The method of claim 1, further comprising:
modifying the image to align the item.

4. The method of claim 1, further comprising:
removing a base from the image, wherein the base is attached to the prop that supports the item.

5. The method of claim 1, further comprising:
cropping the image from a bottom of the image upwards, wherein the cropping is performed using a trained convolutional neural network.

6. The method of claim 1, wherein the removing of the background comprises:
detecting item pixels corresponding to the item and detecting prop pixels corresponding to the prop; and
replacing pixels other than the item pixels or the prop pixels in the image with white pixels.

7. A system comprising:
a memory; and
a controller configured to receive an image of an item and a prop, wherein the prop supports the item, wherein the prop includes a joint, wherein the joint includes a seam that is visible in the image, wherein the controller is configured to modify the image such that the seam of the joint is not visible in the image without altering portions of the image showing the item, wherein the prop is a mannequin, wherein the joint is a shoulder joint, and wherein the controller modifies shoulder joint portions of the image by:
using a trained convolutional neural network to identify the shoulder joint portions in the image;
using an image segmentation model to identify the item in the image;
removing the joint portions using a generative adversarial network that generates a second image with the shoulder joint portions modified; and
combining the second image with the image.

8. The system of claim 7, wherein the controller modifies the image to remove a background.

9. The system of claim 7, wherein the controller modifies the image to align the item.

10. The system of claim 7, wherein the controller removes a base from the image, and wherein the base is attached to the prop that supports the item.

11. The system of claim 9, wherein the controller modifies the image to align the item using a trained convolutional neural network.

12. The system of claim 7, wherein the controller crops the image from a bottom of the image upwards, and wherein the cropping is performed using a trained convolutional neural network.

13. The system of claim 7, wherein the controller removes the background by detecting item pixels corresponding to the item and prop pixels corresponding to the prop, and by replacing pixels other than the item pixels or the prop pixels in the image with white pixels.

\* \* \* \* \*